United States Patent
May et al.

(10) Patent No.: US 8,826,679 B2
(45) Date of Patent: Sep. 9, 2014

(54) REFRIGERATOR ENERGY AND TEMPERATURE CONTROL

(75) Inventors: Jason Andrew May, Prospect, KY (US); Brian Michael Schork, Louisville, KY (US); Bryan James Beckley, Louisville, KY (US)

(73) Assignee: General Electric Company, Schenectady, NY (US)

(*) Notice: Subject to any disclaimer, the term of this patent is extended or adjusted under 35 U.S.C. 154(b) by 390 days.

(21) Appl. No.: 12/957,666

(22) Filed: Dec. 1, 2010

(65) Prior Publication Data

US 2012/0060526 A1    Mar. 15, 2012

(51) Int. Cl.
| | |
|---|---|
| F25B 41/00 | (2006.01) |
| F25B 49/00 | (2006.01) |
| G01K 13/00 | (2006.01) |
| F25D 17/04 | (2006.01) |
| F25D 17/06 | (2006.01) |
| F25D 29/00 | (2006.01) |

(52) U.S. Cl.
CPC ............... *F25D 29/00* (2013.01); *F25D 17/045* (2013.01); *F25D 2700/122* (2013.01); *Y02B 30/743* (2013.01); *F25B 2600/112* (2013.01); *Y02B 30/741* (2013.01); *F25B 2600/111* (2013.01); *F25B 2600/0253* (2013.01); *F25D 2700/12* (2013.01)
USPC ............... 62/208; 62/125; 62/126; 62/127; 62/129; 62/407; 62/408; 62/419

(58) Field of Classification Search
USPC ........... 62/125, 126, 127, 129, 407, 408, 419, 62/208
See application file for complete search history.

(56) References Cited

U.S. PATENT DOCUMENTS

| | | | |
|---|---|---|---|
| 3,938,348 A * | 2/1976 | Rickert | 62/97 |
| 5,881,568 A * | 3/1999 | Kim | 62/443 |
| 6,606,870 B2 | 8/2003 | Holmes et al. | |
| 6,973,793 B2 * | 12/2005 | Douglas et al. | 62/127 |
| 7,100,387 B2 | 9/2006 | Boer et al. | |
| 7,204,429 B2 * | 4/2007 | Olney | 236/49.3 |
| 7,665,320 B2 | 2/2010 | Scrivener et al. | |
| 2005/0061016 A1 * | 3/2005 | Lee et al. | 62/340 |
| 2008/0156030 A1 * | 7/2008 | Cur et al. | 62/448 |
| 2008/0195256 A1 * | 8/2008 | Boer et al. | 700/300 |
| 2008/0196430 A1 * | 8/2008 | McGill et al. | 62/228.1 |
| 2008/0229777 A9 * | 9/2008 | Sim et al. | 62/419 |
| 2008/0314054 A1 * | 12/2008 | An et al. | 62/179 |
| 2011/0126559 A1 * | 6/2011 | Kopko et al. | 62/79 |
| 2011/0225994 A1 * | 9/2011 | Fotiadis et al. | 62/80 |

* cited by examiner

*Primary Examiner* — Mohammad M Ali
*Assistant Examiner* — Daniel C Comings
(74) *Attorney, Agent, or Firm* — Dority & Manning, P.A.

(57) ABSTRACT

Apparatus and methodologies are provided to improve the refrigeration system by precisely controlling refrigerator compartment and heat exchanger temperatures through continuous modulation of device speeds or positions to match capacity with instantaneous load. A controller in a refrigerator is configured to provide a plurality of control loops to control various operational aspects of selected components in the refrigerator. A first loop controls the operating speed of a compressor based on temperature of the evaporator or based on the desired speed of an evaporator fan. A second control loop controls speed of an evaporator fan to maintain a prescribed freezer compartment temperature. A third control loop maintains a prescribed temperature in a fresh food compartment. In certain embodiments selected of the control loops may be thermodynamically coupled by way of thermal interaction between the various cooled compartments rather than being electrically coupled. The control loops may be individually configured as one of a proportional, proportional-integral, or proportional-integral-derivative control loop.

15 Claims, 3 Drawing Sheets

REFRIGERATOR ENERGY AND TEMPERATURE CONTROL

FIELD OF THE INVENTION

The present subject matter relates to refrigerators. More particularly, the present subject matter relates to improved energy consumption and temperature control within refrigerator compartments.

BACKGROUND OF THE INVENTION

Currently available refrigeration systems employ banded temperature control schemes that operated as either ON/OFF or LOW, MED, HIGH and required operational deadbands within their temperature control systems. Such systems include certain inherent inefficiencies such as having to run at lower than optimal evaporation temperatures in order to allow the unit to cycle off for a reasonable amount of time, as well as start losses and reliability penalties associated with starting and stopping a sealed system. In addition, internal humidity control is made more difficult due to off cycle time.

In view of these concerns, it would be advantageous to provide a refrigeration system that could provide a continuously modulated compressor, fan(s) refrigerant control valve(s), and/or damper in order to improve the refrigeration cycle resulting in reductions in the standard deviation of heat exchanger temperatures and compartment temperatures while also maintaining a higher percent run time on the compressor to reduce start losses. A higher percentage of run time would also be advantageous to improve internal humidity control.

BRIEF DESCRIPTION OF THE INVENTION

Aspects and advantages of the invention will be set forth in part in the following description, or may be obvious from the description, or may be learned through practice of the invention.

The present subject matter relates to a method for use in a refrigerator having one or more components including a fresh food compartment, a freezer compartment, a damper between the fresh food compartment and the freezer compartment, a controller, a compressor, a condenser, an evaporator, an evaporator fan, a fresh food fan, and a plurality of condition responsive sensors. The method provides for improving cycle efficiency by configuring the controller to provide continuous modulation of one or more of the speed of the evaporator fan, the speed of the condenser fan, the speed of the fresh food fan, the operating speed of the compressor, and the position of the damper. The method also provides for configuring the controller to maintain prescribed compartment conditions based on at least one of feedback from one or more of the plurality of condition sensors and thermodynamic interaction between one or more of the refrigerator components.

In certain embodiments one of the plurality of condition responsive sensors is a temperature sensor located on one of the evaporator, a suction line of the compressor, or is mounted within the freezer compartment. In other embodiments the plurality of condition responsive sensors includes one or more of a pressure sensor and a flow sensor. In specific embodiments the controller is configured as one of a proportional controller, a proportional-integral controller, and a proportional-integral-derivative controller. In selected embodiments, the controller is configured to maintain prescribed compartment conditions based on thermodynamic interaction between the freezer compartment, the fresh food compartment and the evaporator temperature.

The present subject matter also relates to a method for providing refrigerator compartment temperature control. In selected embodiments, the method provides a refrigerator including a housing including a fresh food compartment and a freezer compartment. The method also provides other refrigerator components including a controller, a compressor, and a condenser. Further, the method positions an evaporator within the freezer compartment and provides an evaporator fan to provide air flow across the evaporator. The method also provides first, second, and third temperature sensor at selected locations within the housing.

In specific embodiments, the method provides for configuring the controller to provide a plurality of control loops, including a first control loop configured to monitor one of temperature from the first temperature sensor or speed of the evaporator fan and to continuously modulate the operating speed of the compressor to maintain a prescribed target evaporator temperature, or the target evaporator fan speed. In these embodiments, the method also provides for configuring the controller to provide a second control loop configured to monitor temperature from the second temperature sensor and to continuously modulate the operating speed of the evaporator fan to maintain a prescribed freezer compartment temperature. Further in these embodiments, the method provides for configuring the controller to provide a third control loop configured to monitor temperature from the third temperature sensor to maintain a prescribed temperature in the fresh food compartment.

In selected embodiments, the method provides for locating the first temperature sensor on one of the evaporator or a suction line of the compressor. In other selected embodiments, the method provides for locating the second temperature sensor within the freezer compartment. In particular embodiments, the method comprises configuring the first controller to monitor speed of the evaporator fan to maintain a target evaporator fan speed.

In further embodiments, the method provides a fresh food fan within the fresh food compartment and provides for configuring the third controller to continuously modulate the operational speed of the fresh food fan to maintain a prescribed temperature in the fresh food compartment. In selected particular embodiments, the method provides a fresh food damper between the fresh food compartment and the freezer compartment causes the third controller to continuously modulate the position of the fresh food damper to maintain a prescribed temperature in the fresh food compartment.

In certain particular embodiments of the method, the method provides for configuring each of the first, second, and third control loops individually as one of a proportional controller, a proportional-integral controller, or a proportional-integral-derivative controller.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
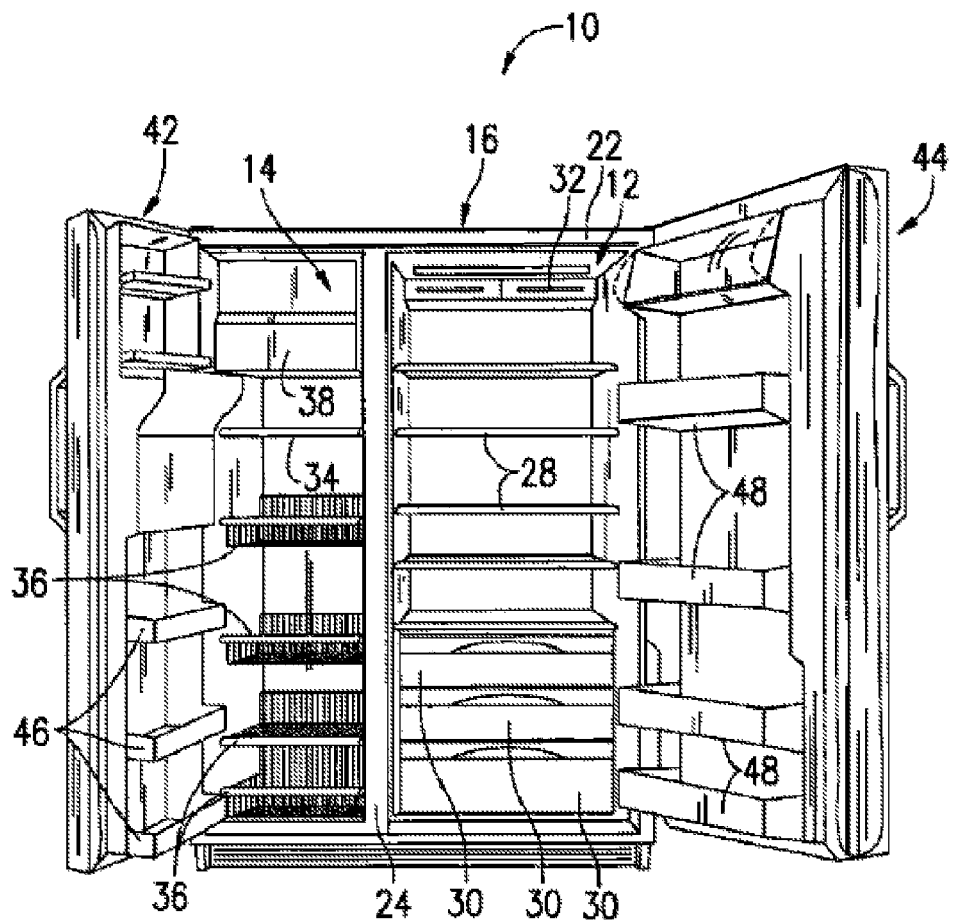
FIG. 1 provides an illustration of an exemplary embodiment of a refrigerator as may be used with the present subject matter.

Repeat use of reference characters throughout the present specification and appended drawings is intended to represent same or analogous features or elements of the invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As noted in the Summary section, the present subject matter is directed toward methods of improved energy consumption through precise temperature control for a refrigerator applying the fundamentals of proportional-integral-differential (PID) feedback control systems to maintain constant compartment and heat exchanger core temperatures.

FIG. 1 provides a front view of a representative refrigerator 10 incorporating an exemplary embodiment of the present invention. For illustrative purposes, the present invention is described with a refrigerator 10 having a construction as shown and described further below. As used herein, a refrigerator includes appliances such as a freezer, refrigerator/freezer combination, compact, and any other style or model of a refrigerator. Accordingly, other configurations including multiple and different styled compartments could be used with refrigerator 10, it being understood that the configuration shown in FIG. 1 is by way of example only.

Refrigerator 10 includes a fresh food storage compartment 12 and a freezer storage compartment 14. Freezer compartment 14 and fresh food compartment 12 are arranged side-by-side within an outer case 16. Breaker strip 22 and mullion 24 form a front face, and extend completely around inner peripheral edges of case 16. In addition, refrigerator 10 includes shelves 28 and slide-out storage drawers 30 which normally are provided in fresh food compartment 12 to support items being stored therein.

Refrigerator 10 is controlled by a processing device or other controller, such as a microprocessor (not shown in FIG. 1), according to user preference via manipulation of a control interface 32 mounted in an upper region of fresh food storage compartment 12 and coupled to the microprocessor. A shelf 34 and wire baskets 36 are provided in freezer compartment 14. In addition, an ice maker 38 may be provided in freezer compartment 14.

A freezer door 42 and a fresh food door 44 close access openings to fresh food and freezer compartments 12, 14, respectively. Each door 42, 44 is mounted to rotate about its outer vertical edge between an open position, as shown in FIG. 1, and a closed position (not shown) closing the associated storage compartment. Freezer door 42 includes a plurality of storage shelves 46, and fresh food door 44 includes a plurality of storage shelves 48.

Figure 2:
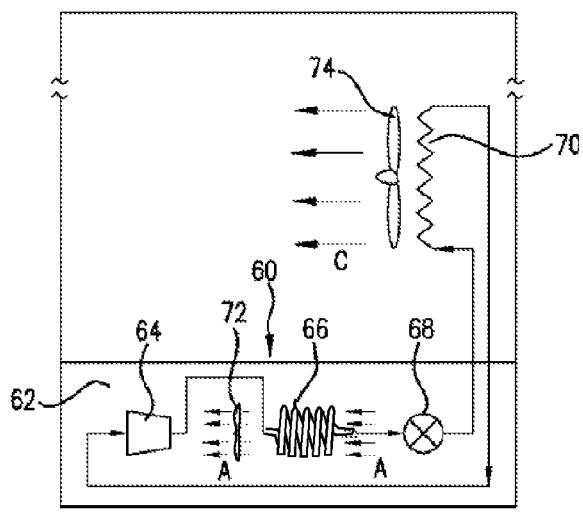
FIG. 2 is a schematic illustration providing an example of a refrigeration cycle as may be used with the present subject matter.

FIG. 2 is a schematic view of refrigerator 10 (FIG. 1) including an exemplary sealed cooling system 60. In accordance with known refrigerators, refrigerator 10 includes a machinery compartment 62 that at least partially contains components for executing a known vapor compression cycle for cooling air. The components include a compressor 64, a heat exchanger or condenser 66, an expansion device 68, and an evaporator 70 connected in series and charged with a refrigerant. Evaporator 70 is also a type of heat exchanger that transfers heat from air passing over the evaporator to a refrigerant flowing through evaporator 70 thereby causing the refrigerant to vaporize. As such, cooled air is produced and configured to refrigerate compartments 12, 14 of refrigerator 10.

From evaporator 70, vaporized refrigerant flows to compressor 64, which operates to increase the pressure of the refrigerant. This compression of the refrigerant raises its temperature, which is lowered by passing the gaseous refrigerant through condenser 66 where heat exchange with ambient air takes place so as to cool the refrigerant. A fan 72 is used to pull air across condenser 66, as illustrated by arrows A, so as to provide forced convection for a more rapid and efficient heat exchange between the refrigerant and the ambient air.

Expansion device 68 further reduces the pressure of refrigerant leaving condenser 66 before being fed as a liquid to evaporator 70. Collectively, the vapor compression cycle components in a refrigeration circuit, associated fans, and associated compartments are sometimes referred to as a sealed refrigeration system operable to force cold air through refrigeration compartments 12, 14. The refrigeration system depicted in FIG. 2 is provided by way of example only. It is within the scope of the present invention for other configurations of the refrigeration system to be used as well. For example, fan 74 may be repositioned so as to push air across evaporator 70, dual evaporators may be used with one or more fans, and numerous other configurations may be applied as well.

Figure 3:
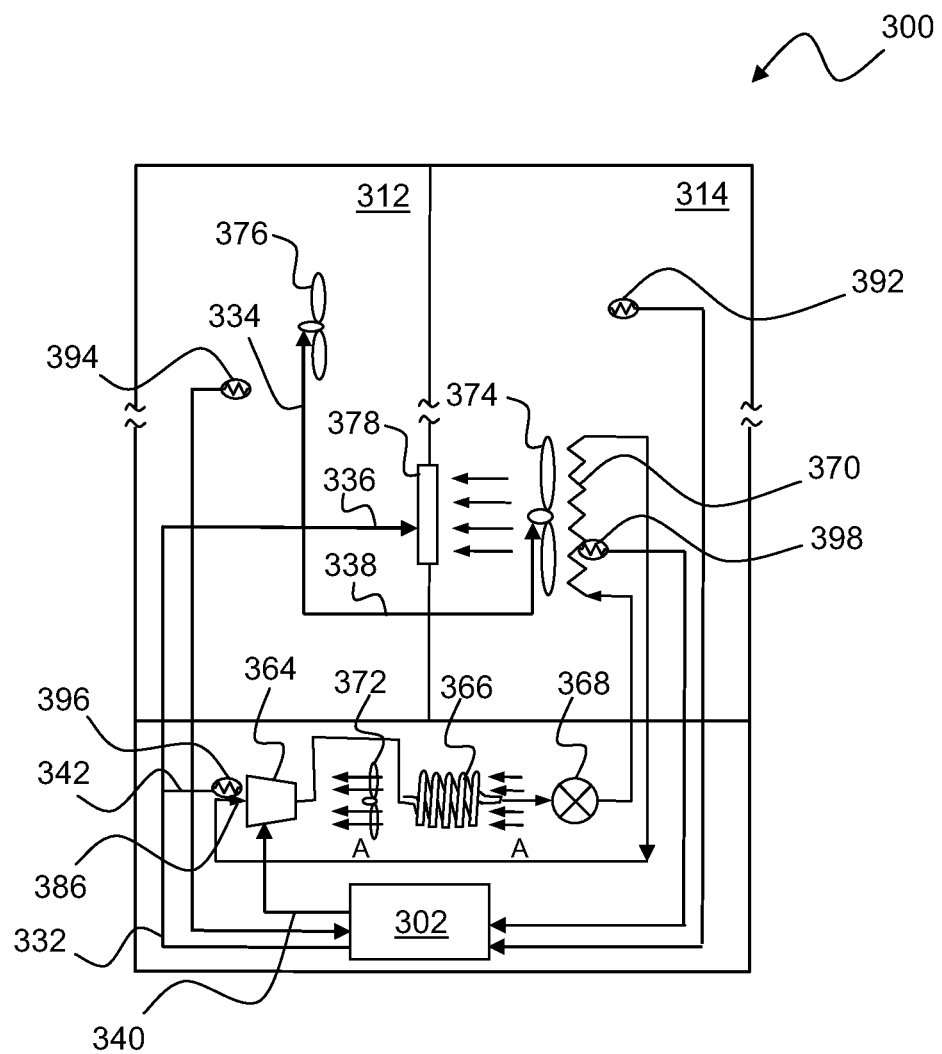
FIG. 3 is a schematic illustration providing an example of a proportional-integral-derivative (PID) controlled refrigerator in accordance with the present technology.

With reference to FIG. 3, there is illustrated a schematic representation of an example of a proportional-integral-derivative (PID) controlled refrigerator 300 in accordance with the present technology. A refrigerator 300 constructed in accordance with present technology operates by continuously modulating speed and/or position of sealed system components including, but not limited to, compressor 364, evaporator fan 374, condenser fan 372, fresh food fan 376, damper 378, or other devices, to match heat loads in real-time thereby delivering constant compartment and heat exchanger temperatures.

In accordance with a significant aspect of the present technology, by limiting the approach temperature of the evaporator and condenser, that is, in the case of the evaporator, the difference between the core evaporator temperature and the desired compartment temperature being cooled, while in the case of the condenser, the difference between the condenser core temperature and the ambient available to reject the heat.

In particular, by employing a controller to continuously modulate the speed of the compressor, the compressor speed can be reduced, resulting in less mass flow of refrigerant to the evaporator so that the evaporator and condenser may be held at desired core temperatures and pressures. In so doing, the extremely low evaporator temperatures that are a natural side effect of cycling systems are able to be substantially eliminated thereby shrinking the size of the refrigeration cycle and minimizing cycling losses to provide a higher compressor EER and system Coefficient of Performance (COP).

In exemplary configurations, such a controller may include, but is not limited to, a proportional (P) controller, a proportional-integral (PI) controller, a proportional-integral-derivative (PID) controller, a Fuzzy Logic based controller, a Neural Network, or a look up table based controller.

Figure 4:
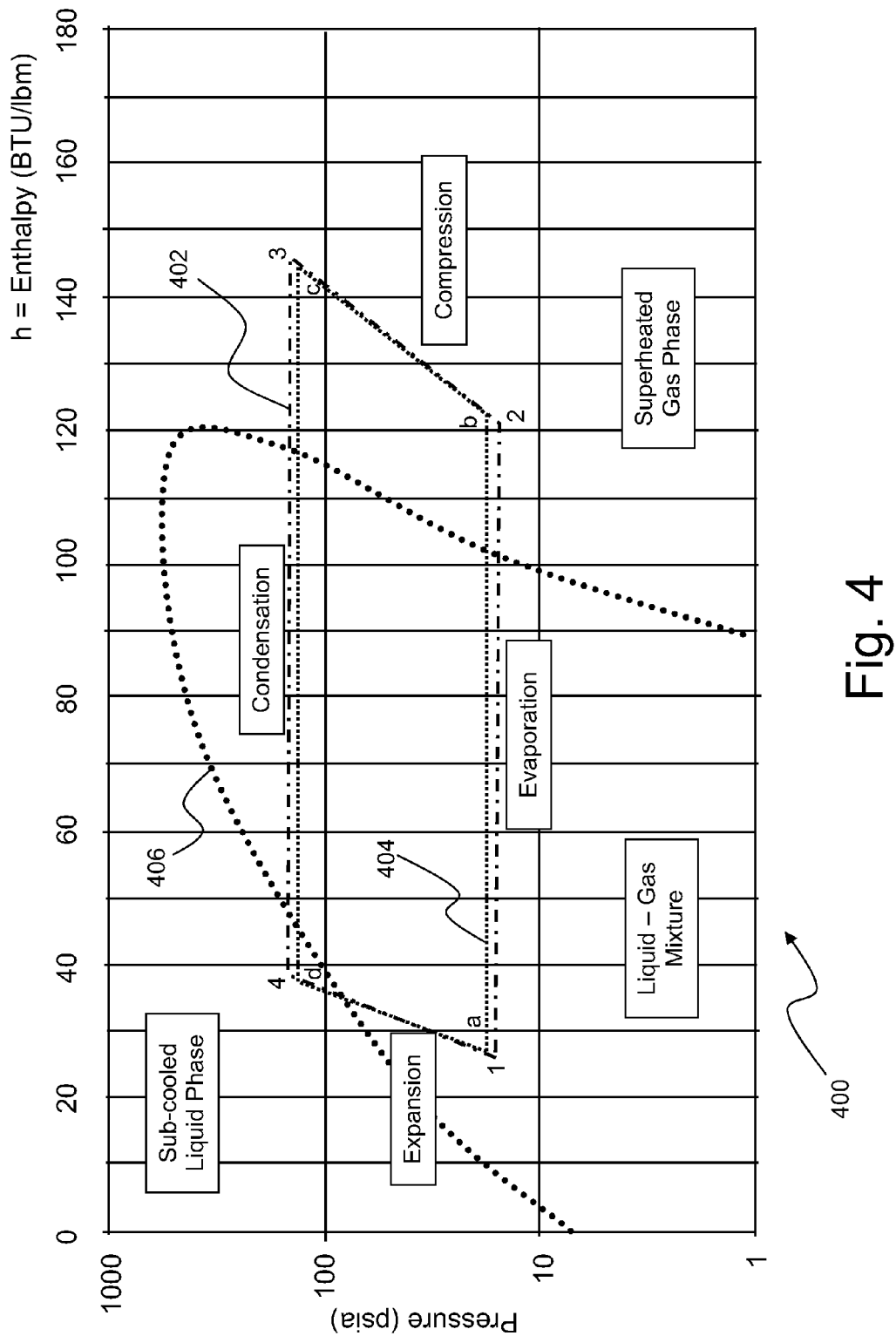
FIG. 4 is a graphical illustration of the state points showing a time averaged baseline cycling control versus a PID modulated cycle in accordance with present technology.

With reference to FIG. 4, there is illustrated a graphical representation 400 demonstrating the energy saving potential between a time averaged baseline cycling control 402 and a PID modulated cycle 404 in accordance with present technology. As can be seen with relation to saturation phase line 406, the average PID modulated cycle 404 transitions from points 1-2-3-4 while baseline cycle 402 transitions from points a-b-c-d. In accordance with present technology, however, this modulated cycle 404 removes the same amount of latent heat over time as the baseline cycle 402 but with fewer start losses and with more stable resulting temperatures. From this it will be appreciated that the latent heat extracted by evaporator $\Delta h_{a-b} = \Delta h_{1-2}$ however the energy of compression is less, i.e., $\Delta h_{b-c} < \Delta h_{2-3}$.

As is understood by those of ordinary skill in the art, a proportional-integral-derivative (PID) control system may be generally defined using the well recognized generic formula:

$$u(t) = K_C \left( e + \frac{1}{T_i} \int_0^t e \, di + T_d \frac{de}{dt} \right)$$

where the three summed terms represent proportional, integral, and derivative terms that, together with a multiplication constant, represent the control function u(t). Such PID control systems may be implemented in numerous manners including through hardware, software, or combinations thereof. It should be appreciated that while the presently illustrated exemplary embodiment describes a PID control system, other systems, as also previously noted, may be used to provide continuous modulation of the various controllable components within a refrigeration system to achieve improved cycle efficiency in accordance with present technology In accordance with an exemplary embodiment of the present subject matter, a control system, including controller 302, provides a plurality of independent or cascaded/embedded proportional-integral-derivative (PID) control loops which drive component speed or position based on system feedback. Controller 302 may correspond to the previously noted microprocessor mentioned with respect to FIG. 1, or could correspond to other known control devices. System feedback to controller 302 could include, but is not limited to, signals from various temperature sensing devices 392, 394, 396, 398 or other devices including pressure and flow sensors not separately illustrated. As illustrated in exemplary form herein, the plurality of controlled loops may be thermodynamically coupled by way of thermal interaction between the cooled compartments 312, 314 rather than electrically coupled to derive cooling for fresh food compartment 312 and freezer compartment 314 of household refrigerator 300.

In a first exemplary embodiment of the present subject matter, three independent PID control loops may be provided. The first PID control loop uses a temperature sensing device as feedback to the PID control loop to modulate compressor 364 speed by way of control line 340 from controller 302 to maintain a prescribed target temperature through varied refrigerant mass flow. In a first configuration of the first PID control loop, temperature sensing device 398 maybe located on evaporator 370 to provide temperature feedback to controller 302. In an alternate configuration of the first PID control loop, the temperature-sensing device may correspond to temperature sensing device 396 that may be located on compressor 364's suction line 386.

Further in accordance with present technology, a second PID control loop uses a temperature-sensing device as feedback to the second PID control loop to modulate the evaporator/freezer fan 374 speed via control lines 332, 338 from controller 302 in order to maintain a prescribed freezer compartment 314 temperature. In this instance, temperature-sensing device 392 is mounted such that it obtains and transmits to controller 302 a representative freezer compartment 314 temperature.

A third PID control loop uses temperature sensing device 394 as feedback to the third PID control loop to modulate the fresh food fan 376 speed via control lines 332, 334 from controller 302 or fresh food damper 378 position via control lines 332, 336 from controller 302 in order to maintain a prescribed fresh food compartment 312 temperature. Temperature-sensing device 394 is mounted such that it obtains and transmits to controller 302 a representative fresh food compartment 312 temperature.

In a second embodiment of the present subject matter, two independent PID control loops with a cascaded/embedded third PID control loop may be provided. In accordance with this second embodiment of the present subject matter, the first PID control loop controlling the operating speed of compressor 364 uses a signal based on the evaporator/freezer fan 374 speed as its feedback instead of the previously employed temperature measuring device to maintain a prescribed target evaporator/freezer fan speed. The two independent control loops, that is, the previously noted second and third PID control loops, operate as previously described with respect to the first embodiment.

In accordance with the present technology, multiple control functions, rather than being electrically connected directly, may be thermodynamically connected. For example, when the fresh food door 44 (FIG. 1) of refrigerator 10 is opened, the compressor senses the door opening by a thermodynamic connection as follows. The door opening results in heat entering the fresh food compartment 12 so that the fresh food compartment temperature increases. A damper 378 (FIG. 3) opens which places more load on evaporator 370 in the freezer compartment 314. As evaporator 370 warms due to the heat load, the controller system controlling the compressor senses the higher evaporator temperature and increases the speed of the compressor 364. In an exemplary configuration this controlled increase in speed may be by way of continuous modulation of speed via a PID controller.

The increase in speed of the compressor 364 increases mass flow of refrigerant through evaporator 370 and brings the evaporator temperature back down to a desired target temperature. As heat is rejected, damper 378 begins to close back to its original state and the evaporator cools so that the compressor may then slow back down. In such a configuration, the coupling between the fresh food controller and the freezer controller is by way of the thermodynamic coupling controlled by operation of the damper and not an electrical connection as may be used in other embodiments.

An embodiment of the present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits. The technical effect of the executable code is to facilitate prediction and optimization of modeled devices and systems.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for providing refrigerator compartment temperature control, comprising:
    providing a housing including a fresh food compartment and a freezer compartment;
    providing a controller, a compressor, and a condenser;
    positioning an evaporator within the freezer compartment or fresh food compartment;
    positioning an evaporator fan to provide air flow across the evaporator;
    positioning a fresh food fan within the fresh food compartment such that operation of the fresh food fan draws airflow from the freezer compartment to the fresh food compartment;
    providing, second, and third temperature sensors;
    configuring the controller to provide a plurality of control loops, including a first control loop configured to maintain a target evaporator fan operating speed by continuously modulating the operating speed of the compressor based on the evaporator fan operating speed specified by the controller in implementing a second control loop;
    configuring the controller to provide the second control loop configured to monitor temperature from the second temperature sensor and to continuously modulate the operating speed of the evaporator fan to maintain a prescribed freezer compartment temperature, wherein the second temperature sensor is located with the freezer compartment; and
    configuring the controller to provide a third control loop configured to monitor temperature from the third temperature sensor and to continuously modulate the operating speed of the fresh food fan to maintain a prescribed temperature in the fresh food compartment, wherein the third temperature sensor is located within the fresh food compartment;
    wherein the first control loop is embedded with respect to the second control loop.

2. A method as in claim 1, further comprising configuring each of the first, second, and third control loops individually as one of a proportional controller, a proportional-integral controller, or a proportional-integral-derivative controller.

3. A refrigerator comprising:
    a housing comprising a fresh food compartment and a freezer compartment;
    a damper placed between the fresh food compartment and the freezer compartment, the damper having an adjustable position such that an amount of airflow between the fresh food compartment and the freezer compartment can be adjusted based on the damper position;
    a refrigerant system comprising a compressor, a condenser, an expansion device, and an evaporator;
    an evaporator fan positioned to induce airflow across the evaporator and into the freezer compartment; and
    a controller configured to operate a first control loop, a second control loop, and a third control loop;
    wherein the first control loop continuously modulates an evaporator fan operating speed based on feedback provided by a first temperature sensor monitoring the temperature within the freezer compartment;
    wherein the second control loop continuously modulates the position of the damper based on feedback provided by a second temperature sensor monitoring the temperature within the fresh food compartment; and
    wherein the third control loop continuously modulates a compressor operating speed to maintain a target evaporator fan operating speed, and wherein the third control loop continuously modulates the compressor operating speed based on the evaporator fan operating speed specified by the controller in implementing the first control loop, such that the third control loop is embedded with respect to the first control loop.

4. The refrigerator of claim 3, wherein the controller is a proportional-integral-derivative controller configured to respectively operate the first, second, and third control loops using proportional-integral-derivative control logic.

5. The refrigerator of claim 3, wherein the compressor continuously operates and the third control loop continuously modulates the compressor operating speed such that a difference between the temperature of the evaporator and a desired freezer compartment temperature is continuously minimized.

6. The method of claim 1, wherein continuously modulating the operating speed of the fresh food fan comprises continuously modulating the operating speed of the fresh food fan without use of banded temperature control.

7. The method of claim 1, further comprising configuring each of the first, second, and third control loops as an independent proportional-integral-derivative controller, such that any interaction between the first, second, and third control loops occurs by way of thermodynamic interaction among the components of the refrigerator.

8. The refrigerator of claim 3, wherein the housing further comprises a separating wall, wherein the separating wall comprises a defining wall for each of the fresh food compartment and the freezer compartment, wherein the separating wall defines an opening between the fresh food compartment and the freezer compartment, and wherein the damper is positioned within the opening.

9. The refrigerator of claim 3, wherein the operating speed of the evaporator fan is continuously modulated along a spectrum of speeds that does not include operational bands.

10. The refrigerator of claim 3, wherein the first control loop is embedded within the third control loop.

11. A refrigerator comprising:
    a housing comprising a fresh food compartment, a freezer compartment, and a separating wall, wherein the separating wall comprises a defining wall of each of the fresh food compartment and the freezer compartment, and wherein the separating wall has an opening that provides an amount of airflow between the fresh food compartment and the freezer compartment;

a damper positioned within the opening of the separating wall, wherein the damper has an adjustable position such that the amount of airflow between the fresh food compartment and the freezer compartment can be adjusted based on the damper position;

a refrigerant system comprising a compressor, a condenser, an expansion device, and an evaporator;

an evaporator fan positioned to induce airflow across the evaporator and into the freezer compartment; and a controller configured to operate a first control loop, a second control loop, and a third control loop;

wherein the first control loop continuously modulates an evaporator fan operating speed based on feedback provided by a first temperature sensor monitoring the temperature within the freezer compartment;

wherein the second control loop continuously modulates the position of the damper based on feedback provided by a second temperature sensor monitoring the temperature within the fresh food compartment; and wherein the third control loop continuously modulates a compressor operating speed to maintain a target evaporator fan operating speed, and wherein the third control loop continuously modulates the compressor operating speed based on the evaporator fan operating speed specified by the controller in implementing the first control loop, such that the third control loop is embedded with respect to the first control loop.

12. The refrigerator of claim 11, wherein the operating speed of the evaporator fan is continuously modulated along a spectrum of speeds that does not include operational bands.

13. The refrigerator of claim 11, wherein each of the first, second, and third control loops is configured according to proportional-integral-derivative control logic.

14. The refrigerator of claim 13, wherein the first, second, and third control loops are independent from each other such that any interaction between the first, second, and third control loops occurs by way of thermodynamic interaction among the components of the refrigerator.

15. The refrigerator of claim 11, wherein the position of the damper is continuously modulated based on feedback provided by the second temperature sensor without the use of temperature bands.

* * * * *